Oct. 26, 1943.  J. EATON  2,332,995

THERMOSTATIC FLUID MIXING DEVICE

Filed March 26, 1940  4 Sheets-Sheet 1

INVENTOR
John Eaton
BY
Nathaniel Frucht
ATTORNEY

Oct. 26, 1943.  J. EATON  2,332,995
THERMOSTATIC FLUID MIXING DEVICE
Filed March 26, 1940  4 Sheets-Sheet 2

Oct. 26, 1943.   J. EATON   2,332,995
THERMOSTATIC FLUID MIXING DEVICE
Filed March 26, 1940   4 Sheets-Sheet 3

INVENTOR
John Eaton
BY
Nathaniel Frucht
ATTORNEY

Oct. 26, 1943. J. EATON 2,332,995
THERMOSTATIC FLUID MIXING DEVICE
Filed March 26, 1940 4 Sheets-Sheet 4

INVENTOR
John Eaton
BY Nathaniel Frucht
ATTORNEY

Patented Oct. 26, 1943

2,332,995

UNITED STATES PATENT OFFICE 2,332,995

THERMOSTATIC FLUID MIXING DEVICE

John Eaton, Cheltenham, England, assignor to Walker, Crosweller & Company Limited, Cheltenham, England Application March 26, 1940, Serial No. 325,934
In Great Britain June 22, 1939

6 Claims. (Cl. 236—12)

This invention comprises improvements in, or relating to, fluid mixing devices of the kind having a chamber, in which fluid streams of different temperatures are mixed, and a thermostat for controlling the volumes of the fluids admitted to such chamber, and thereby regulating the temperature of the mixture.

The principal object of the present invention is to provide an improved construction adapted for obtaining a uniform mixing of large volumes of fluid while ensuring an accurate and sensitive control by the thermostat.

According to this invention, separate valves, adjustable by the thermostat, are provided for the admission of each fluid to the mixing chamber which is adapted for ensuring intimate contact of the mixture with the thermostat before its discharge for use. The valves are preferably in the form of rotary ported sleeves adjustable around ported cylinders or tubes serving for the admission of the respective fluids. The employment of separate valves for each fluid enables relatively large volumes to be mixed, while ensuring that each valve is subject only to the pressure and temperature of its own supply. Thus the risk of binding or seizing of the valve arising due to distortion caused by unequal temperatures at different parts, is avoided.

The valves may also be provided with cylindrical shields with small closely arranged openings which serve for breaking up the fluid into numerous jets and assisting the diffusion of the fluids and their accurate mixing. The valves may be provided with a baffle plate having an outlet for directing the mixture centrally into the thermostat chamber in which is disposed a cylindrical baffle or inner casing for ensuring that the mixture passes over the whole of the thermostat before its discharge through a suitable outlet in the base. The thermostat may effect the adjustment of the valves in any suitable manner, for example, through a parallel linkage device, or by means of gearing. In the latter case, the stem or spindle of the thermostat may be provided with a pinion meshing with toothed quadrants or pinions on the valves, such arrangement enabling relatively high loads to be dealt with efficiently, while minimizing the amount of material employed in the construction of the thermostat, by the use of an appropriate gear ratio.

In order to enable the invention to be readily understood, reference will now be made to the accompanying drawings illustrating by way of example, one construction for carrying the invention into effect, in which drawings.

Figure 1:
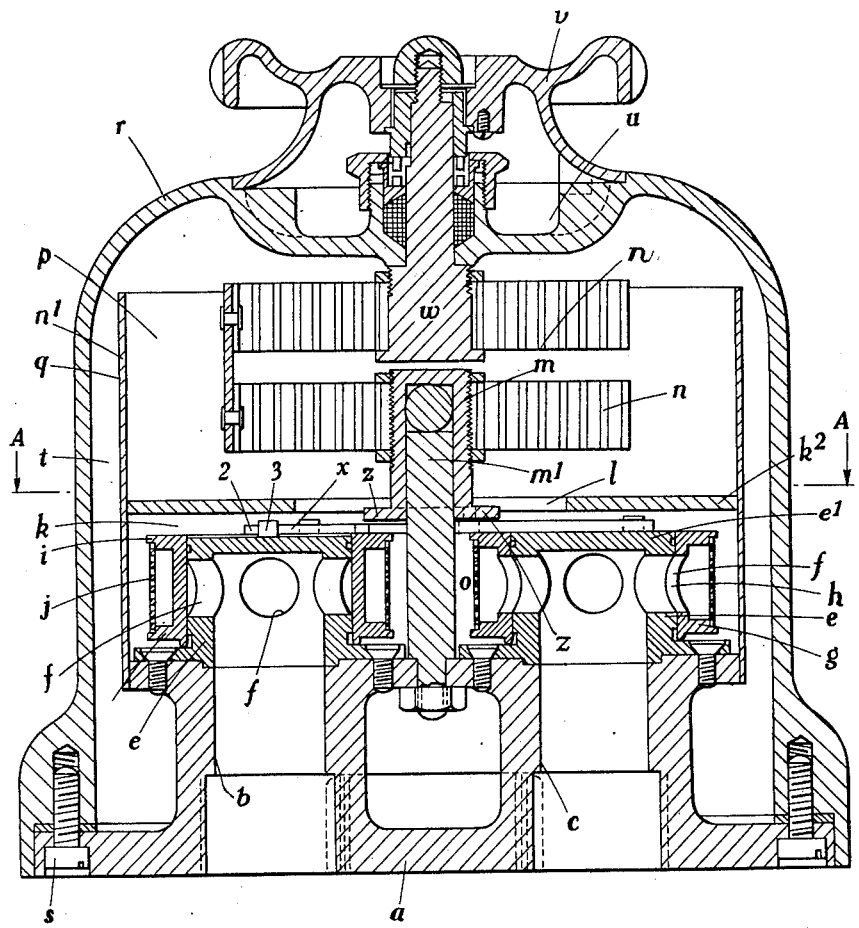
Figure 1 is a central vertical section.
Figure 2:
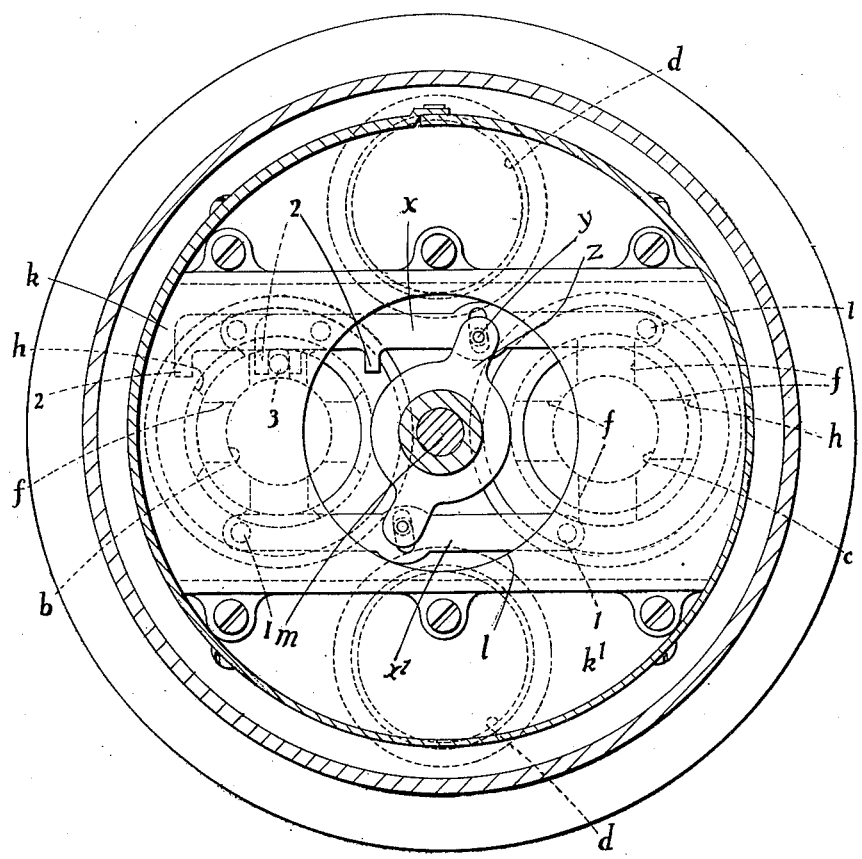
Figure 2 is a section on the line A—A of Figure 1.

Referring to Figures 1 and 2 of the drawings, a flat circular base plate $a$ is formed along one diameter with upstanding fluid inlets $bc$, and along another diameter with alternative discharge outlets $d$ for the hot water derived from the mixing of the fluids, such as cold water and steam. Secured to the upper flanged periphery of each inlet is a tubular valve seat $e$ having a closed top $e^1$ and formed in its cylindrical wall with diametrical ports $f$. For example, there may be four ports spaced at 90° from each other, and if desired, there may be two rows of such ports. Disposed around each valve seat is a ported valve sleeve $g$ adapted to be rotated to bring its ports $h$ into or out of alignment with those in the valve seat. The sleeve is formed, at its upper and lower edges, with annular flanges $i$ between the peripheries of which is disposed a cylindrical baffle $j$ formed with numerous small openings through which the fluid emerges into the mixing chamber $k$. The latter is of inverted channel section, and is disposed over the valves, its side walls having lugs $k^1$ to enable it to be secured by bolts to the base $a$ while its upper part $k^2$ is formed with a central opening $l$ through which depends the spindle $m$ of a spiral thermostat $n$, such spindle being rotatably socketed over a bolt $m^1$ upstanding centrally from the base. An annular space $o$ remains around the spindle for the passage of the mixed fluid from the mixing chamber $k$ into the thermostat chamber $p$. The ends of the channel section mixing chamber $k$ are closed by a tall cylindrical member $q$ seated on the base and of such a height that its upper edge extends to approximately the level of the top of the thermostat device. A bell-shaped casing $r$, which is secured by screws $s$ to the periphery of the base, provides an annular passage-way $t$ between it and the cylindrical member, for the hot water passing over the upper edge of the latter from the thermostat chamber $p$ into one of the discharge outlets $d$. A central depression $u$ in the upper wall of the casing is adapted to receive a knob or handle $v$ secured to the spindle $w$ of the upper thermostat to enable the thermostat to be manually adjusted.

Rotational differential adjustment of the valves g may be transmitted from the spindle m by means of a parallel linkage $xx^1$ engaged with the valves and with pins on the ends of a diametrical arm z mounted on the lower end of the spindle. Thus the arm z may have a pin and slot engagement y with the links between their ends. Each end of one link $x^1$ is engaged with a pin on the upper end of a valve, while one end of the other link x has similar engagement with a pin l of one valve and its other end is formed with jaws or projections 2 adapted for engagement with a fixed stop z, which may be provided on one of the valve seats, for the purpose of limiting the rotational movement of the valves in either direction. The arrangement is such as to effect differential adjustment of the valves for obtaining a mixture of constant temperature as determined by the settling of the thermostat.

Figure 3:
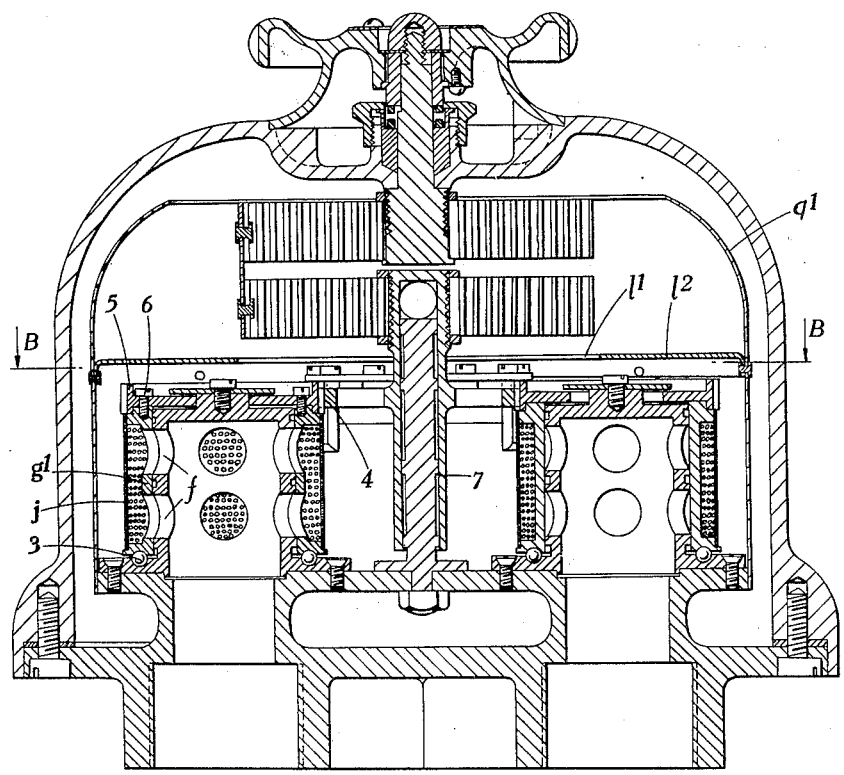
Figure 3 is a central vertical section of a modified construction.
Figure 4:
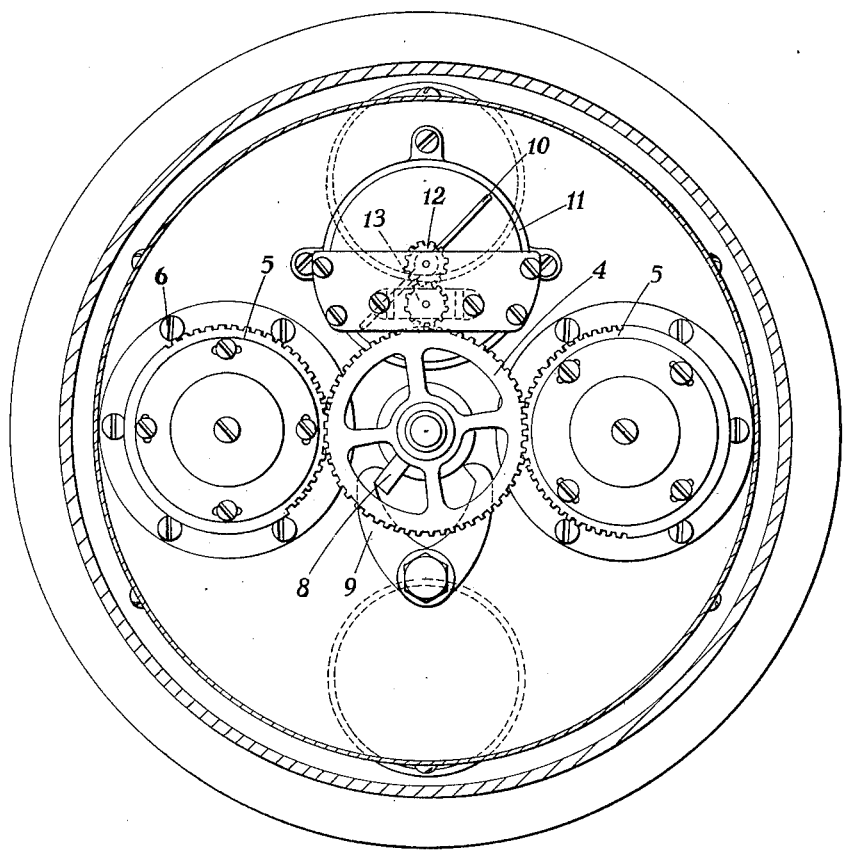
Figure 4 is a section on the line B—B of Figure 3.

According to the modified construction illustrated in Figures 3 and 4, the valves $g^1$ are rotatable on stainless steel ball thrust bearings 3. Fluid flows out of each valve through two rows of ports $f^1$ and passes through a central opening $l^1$ in a baffle plate $l^2$ riveted to an inner casing $q^1$ corresponding to the cylindrical member q in Figures 1 and 2. The valves are driven from the thermostat by means of a pinion 4 formed on the thermostat spindle and meshing with pinions 5 provided with teeth over approximately half of their circumference and secured by screws 6 to the tops of the valves. The rotational movement of the thermostat 7 is limited by a stop arm 8 projecting radially therefrom and which engages with a caliper-like member 9. The arms of the latter may be adjustable ofr permitting any desired angular movement of the spindle. The thermostat pinion 4 drives, by means of the small pinions 12, 13, a damping vane 10 disposed diametrically in a cylinder 11 filled with liquid. This damping device retards the action of the thermostat and prevents any tendency to surge. Surging may be caused by sudden pressure or temperature variations, and is usually due to either temporary or inherent defective mixing. This causes the thermostat to turn suddenly, thus aggravating the conditions which originally caused the surge and tending to maintain these conditions. The provision of the damping device prevents sudden movement of the thermostat, so that the mixture has time to right itself before any harm is done.

The constructions described are particularly suitable for water and steam mixers. The invention is equally applicable, however, for mixing hot and cold water in which case the baffles j may be omitted.

The improved arrangement is of simple construction and is composed of a minimum number of parts. The employment of two valves not only enables accurate and sensitive control to be obtained, but also permits the use of a relatively small thermostat unit. The arrangement also prevents the possibility of jamming of valves in their seats and ensures an efficient control of large volumes of fluids at low pressures. The simple construction of the base not only facilitates production, but also reduces manufacturing costs inasmuch as the provision of cored passages is avoided.

Having described my invention what I claim and desire to secure by Letters Patent is:

1. A thermostatic fluid mixing device comprising a casing having a valve chamber, a base in said valve chamber provided with spaced hot and cold fluid inlets, cylindrical valve seats having closed upper ends and positioned over said inlets and provided with a plurality of circumferentially disposed wall outflow ports, said valve seats being spaced apart and in parallel relation, sleeve valves rotatably mounted on said valve seats and having valve ports cooperating with said outflow ports to control fluid flow from said inlets, whereby a plurality of fluid streams outflow circumferentially of the valves, a thermostatic chamber communicating with the valve chamber for receiving mixed fluid therefrom, a thermostat in said thermostatic chamber positioned to be contacted by the mixed fluid, and means connecting the thermostat to the valves for turning the valves to simultaneously reduce flow through one valve and increase flow through the other valve, upon change of temperature of the mixed fluid.

2. A thermostatic fluid mixing device comprising a casing having a valve chamber, a base in said valve chamber provided with spaced hot and cold fluid inlets, cylindrical valve sets having closed upper ends and positioned over said inlets and provided with a plurality of circumferentially disposed wall outflow ports, said valve seats being spaced apart and in parallel relation, sleeve valves rotatably mounted on said valve seats and having valve ports cooperating with said outflow ports to control fluid flow from said inlets, whereby a plurality of fluid streams outflow circumferentially of the valves, said valves having cylindrical foraminated shields mounted on the exterior thereof in spaced relation to the valve ports, whereby the flow therefrom is broken into small streams, a thermostatic chamber communicating with the valve chamber for receiving mixed fluid therefrom, a thermostat in said thermostatic chamber positioned to be contacted by the mixed fluid, and means connecting the thermostat to the valves for turning the valves to simultaneously reduce flow through one valve and increase flow through the other valve, upon change of temperature of the mixed fluid.

3. A thermostatic fluid mixing device comprising a casing having a valve chamber, a base in said valve chamber provided with spaced hot and cold fluid inlets, cylindrical valve seats having closed upper ends and positioned over said inlets and provided with a plurality of circumferentially disposed wall outflow ports, said valve seats being spaced apart and in parallel relation, sleeve valves rotatably mounted on said valve seats and having valve ports cooperating with said outflow ports to control fluid flow from said inlets, whereby a plurality of fluid streams outflow circumferentially of the valves, a thermostatic chamber communicating with the valve chamber for receiving mixed fluid therefrom, a partition baffle positioned between said valve chamber and said thermostatic chamber and having a central flow opening therethrough, a thermostat in said thermostatic chamber positioned to be contacted by the mixed fluid, and means connecting the thermostat to the valves for turning the valves to simultaneously reduce flow through one valve and increase flow through the other valve, upon change of temperature of the mixed fluid.

4. A thermostatic fluid mixing device comprising a casing having a valve chamber, a base in said valve chamber provided with spaced hot and cold fluid inlets, cylindrical valve seats having closed upper ends and positioned over said inlets and provided with a plurality of circumferentially disposed wall outflow ports, said valve seats being spaced apart and in parallel relation, sleeve valves rotatably mounted on said valve seats and having valve ports cooperating with said outflow ports to control fluid flow from said inlets, whereby a plurality of fluid streams outflow circumferentially of the valves, a thermostatic chamber communicating with the valve chamber for receiving mixed fluid therefrom, a thermostat in said thermostatic chamber positioned to be contacted by the mixed fluid, and means comprising gear connections connecting the thermostat to the valves for turning the valves to simultaneously reduce flow through one valve and increase flow through the other valve, upon change of temperature of the mixed fluid.

5. A thermostatic fluid mixing device comprising a casing having a valve chamber, a base in said valve chamber provided with spaced hot and cold fluid inlets, cylindrical valve seats having closed upper ends and positioned over said inlets and provided with a plurality of circumferentially disposed wall outflow ports, said valve seats being spaced apart and in parallel relation, sleeve valves rotatably mounted on said valve seats and having valve ports cooperating with said outflow ports to control fluid flow from said inlets, whereby a plurality of fluid streams outflow circumferentially of the valves, said valves having cylindrical foraminated shields mounted on the exterior thereof in spaced relation to the valve ports, whereby the flow therefrom is broken into small streams, a thermostatic chamber communicating with the valve chamber for receiving mixed fluid therefrom, a thermostat in said thermostatic chamber positioned to be contacted by the mixed fluid, and means comprising gear connections connecting the thermostat to the valves for turning the valves to simultaneously reduce flow through one valve and increase flow through the other valve, upon change of temperature of the mixed fluid.

6. A thermostatic fluid mixing device comprising a casing having a valve chamber, a base in said valve chamber provided with spaced hot and cold fluid inlets, cylindrical valve seats having closed upper ends and positioned over said inlets and provided with a plurality of circumferentially disposed wall outflow ports, said valve seats being spaced apart and in parallel relation, sleeve valves rotatably mounted on said valve seats and having valve ports cooperating with said outflow ports to control fluid flow from said inlets, whereby a plurality of fluid streams outflow circumferentially of the valves, a thermostatic chamber communicating with the valve chamber for receiving mixed fluid therefrom, a partition baffle positioned between said valve chamber and said thermostatic chamber and having a central flow opening therethrough, a thermostat in said thermostatic chamber positioned to be contacted by the mixed fluid, and means comprising gear connections connecting the thermostat to the valves for turning the valves to simultanously reduce flow through one valve and increase flow through the other valve, upon change of temperature of the mixed fluid.

JOHN EATON.